United States Patent
Li et al.

(10) Patent No.: US 12,257,890 B2
(45) Date of Patent: Mar. 25, 2025

(54) COOLING CONTROL METHOD AND SYSTEM FOR VEHICLE, AND VEHICLE

(71) Applicant: GREAT WALL MOTOR COMPANY LIMITED, Baoding (CN)

(72) Inventors: Xuemeng Li, Baoding (CN); Chao Li, Baoding (CN); Haolong Fan, Baoding (CN); Zhenhui Liu, Baoding (CN); Ming Sun, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 154 days.

(21) Appl. No.: 18/010,395

(22) PCT Filed: Aug. 19, 2021

(86) PCT No.: PCT/CN2021/113432
§ 371 (c)(1),
(2) Date: Dec. 14, 2022

(87) PCT Pub. No.: WO2022/042408
PCT Pub. Date: Mar. 3, 2022

(65) Prior Publication Data
US 2023/0249539 A1    Aug. 10, 2023

(30) Foreign Application Priority Data
Aug. 25, 2020 (CN) .......................... 202010865774.6

(51) Int. Cl.
*B60K 11/08* (2006.01)
*B60H 1/00* (2006.01)

(52) U.S. Cl.
CPC .......... *B60K 11/085* (2013.01); *B60H 1/0073* (2019.05)

(58) Field of Classification Search
CPC ....... B60K 11/085; B60K 11/00; B60K 11/02; B60K 11/06; B60H 1/0073; B60H 1/32;
(Continued)

(56) References Cited

U.S. PATENT DOCUMENTS

| | | | |
|---|---|---|---|
| 9,410,751 B2 * | 8/2016 | David | F28F 27/00 |
| 2002/0099482 A1 * | 7/2002 | Reese, II | F01P 11/14 |
| | | | 701/31.4 |

(Continued)

FOREIGN PATENT DOCUMENTS

| CN | 106080173 | 11/2016 |
|---|---|---|
| CN | 106314110 | 1/2017 |

(Continued)

OTHER PUBLICATIONS

International Search Report for Application No. PCT/CN2021/113432, mailed Nov. 26, 2021 (4 pages).

(Continued)

*Primary Examiner* — Mary Cheung
(74) *Attorney, Agent, or Firm* — NIXON PEABODY LLP; Jeffrey L. Costellia

(57) ABSTRACT

A method and a system for controlling cooling of a vehicle, and a vehicle are provided in the present disclosure. In the present disclosure, a maximum value among cooling demand values of cooling objects is used to control a servo component in a cooling system to operate according to an execution opening determined by a preset corresponding relation, so that operating states of the servo components may be correlated and may be comprehensively controlled, so as to prevent the control system from oscillating and improve control stability, thus solving a problem that periodic oscillation of the operating states of the servo compo- (Continued)

nents is easily caused and service life of the servo components is affected in existing control modes of the cooling system of the vehicle.

6 Claims, 4 Drawing Sheets

(58) Field of Classification Search
CPC .. B60Y 2400/302; B60Y 2400/40; F01P 7/04; Y02T 10/88
See application file for complete search history.

(56) References Cited

U.S. PATENT DOCUMENTS

| | | | | |
|---|---|---|---|---|
| 2009/0148727 | A1* | 6/2009 | Taniguchi | H01M 8/04007 429/430 |
| 2018/0328330 | A1 | 11/2018 | Terahata | |
| 2019/0223330 | A1* | 7/2019 | Chen | H05K 7/20272 |
| 2020/0376927 | A1* | 12/2020 | Rajaie | B60H 1/00764 |

FOREIGN PATENT DOCUMENTS

| | | | | |
|---|---|---|---|---|
| CN | 107487176 | | 12/2017 | |
| CN | 107499176 | | 12/2017 | |
| CN | 107521330 | | 12/2017 | |
| CN | 108 068 610 | A | 5/2018 | |
| CN | 108297677 | | 7/2018 | |
| CN | 111376709 | | 7/2020 | |
| CN | 111376710 | | 7/2020 | |
| CN | 112060903 | | 12/2020 | |
| DE | 102013204703 | A1 * | 10/2013 | ............ B60K 11/00 |
| JP | 2004-353554 | | 12/2004 | |
| JP | 2006-213210 | | 8/2006 | |
| KR | 10-2019-0073645 | | 6/2019 | |
| WO | WO-2013156700 | A1 * | 10/2013 | ................ F01P 7/04 |

OTHER PUBLICATIONS

Chinese Office Action for Application No. 202010865774.6, mailed May 17, 2021 (8 pages).
Extended European Search Report for App. No. 21860246.4, dated Apr. 3, 2024 (8 pages).

* cited by examiner

COOLING CONTROL METHOD AND SYSTEM FOR VEHICLE, AND VEHICLE

CROSS-REFERENCE TO RELEVANT APPLICATIONS

This application is a national phase of PCT application No. PCT/CN2021/113432, filed on Aug. 19, 2021, which claims the priority of the Chinese patent application filed on Aug. 25, 2020 before the CNIPA, China National Intellectual Property Administration with the application number of 202010865774.6 and the title of "COOLING CONTROL METHOD AND SYSTEM FOR VEHICLE, AND VEHICLE", which is incorporated herein in its entirety by reference.

TECHNICAL FIELD

The present disclosure relates to the technical field of automobiles and, more particularly, to a method and a system for controlling cooling of a vehicle, and a vehicle.

BACKGROUND

At present, a vehicle is generally equipped with a cooling system for maintaining various parts of the vehicle in a suitable operating temperature range, so as to ensure normal, stable and efficient operation of the various parts and ensure a passenger compartment to meet comfort requirement of passengers.

However, control logics of servo components in the cooling system are independent of each other, but operating states of the servo components may affect each other. Taking a cooling fan and a cooling water pump as an example, during a cooling process, if a state of the cooling fan changes, a balance point of a system is broken, the water pump is required to be cooperated with the fan to adjust speed. Meanwhile, after the speed of the water pump is adjusted, a state of the fan is required to be correspondingly adjusted again, which results in periodic oscillation of the operating states of the servo components in the cooling system and affects service life of the servo components.

SUMMARY

In view of the above, the present disclosure aims at providing a method and a system for controlling cooling of a vehicle, and a vehicle, so as to solve a problem that periodic oscillation of operating states of servo components is easily caused and service life of the servo components is affected in existing control modes of a cooling system of a vehicle.

To achieve above objectives, technical solutions of the present disclosure are implemented as follows:

A method for controlling cooling of a vehicle, including:
when the vehicle is operating, acquiring a current temperature value and a temperature change rate of a cooling object in the vehicle;
determining a cooling demand value of the cooling object according to the current temperature value and the temperature change rate of the cooling object, and the cooling demand value is configured to describe cooling demand intensity of a corresponding cooling object; and
determining an execution opening of a servo component in a cooling system of the vehicle according to a target demand value among the cooling demand values and a preset corresponding relation, and controlling the servo component to operate according to a corresponding execution opening so as to cool the cooling object.

In an embodiment, in the method, the step of determining the cooling demand value of the cooling object according to the current temperature value and the temperature change rate of the cooling object includes:
according to the current temperature value and the temperature change rate of the cooling object, querying a preset cooling demand table and determining the cooling demand value of the cooling object;
wherein the cooling demand table being configured to describe a corresponding relation between a temperature value as well as the temperature change rate and the cooling demand value.

In an embodiment, in the method, the step of determining the execution opening of the servo component in the cooling system of the vehicle according to the target demand value among the cooling demand values and the preset corresponding relation and controlling the servo component to operate according to the corresponding execution opening so as to cool the cooling object includes:
determining the maximum value among the cooling demand values as the target demand value;
according to the target demand value, querying a control strategy table which is preset and determining the execution openings of the servo components, and the control strategy table is configured to describe the corresponding relation between the execution opening of each of the servo components and the demand value; and
according to the execution opening of the servo component, controlling a corresponding servo component to operate.

In an embodiment, in the method, a plurality of demand value intervals are set in the control strategy table, and the execution openings corresponding to the servo components are different in at least two demand value intervals.

In an embodiment, in the method, before the step of according to the target demand value, querying the preset control strategy table and determining the execution openings of the servo components, the method includes:
determining a first demand value interval where the last demand value is located;
determining an upper limit value and a lower limit value of the first demand value interval according to the control strategy table;
when difference between the lower limit value and the target demand value reaches an interval switching threshold, or difference between the target demand value and the upper limit value reaches the interval switching threshold, performing the step of according to the target demand value, querying the preset control strategy table and determining the execution openings of the servo components; and
when the difference between the lower limit value and the target demand value does not reach the interval switching threshold, and the difference between the target demand value and the upper limit value does not reach the interval switching threshold, maintaining the current execution openings of the servo components.

In an embodiment, in the method, in the control strategy table, when the target demand value is less than or equal to a first cooling threshold, the execution openings corresponding to the servo components are 0;

when the target demand value is greater than or equal to a second cooling threshold, the execution openings corresponding to the servo components are an opening upper limit value; and the second cooling threshold being greater than the first cooling threshold.

In an embodiment, in the method, the servo component includes a fan, a water pump and a grille shutter.

Another objective of the embodiments of the present disclosure is to provide a system for controlling cooling of a vehicle, including:

an acquisition module configured to, when the vehicle is operating, acquire a current temperature value and a temperature change rate of a cooling object in the vehicle;

a determination module configured to determine a cooling demand value of the cooling object according to the current temperature value and the temperature change rate of the cooling object, and the cooling demand value is configured to describe cooling demand intensity of a corresponding cooling object; and a control module configured to determine an execution opening of a servo component in a cooling system of the vehicle according to a target demand value among the cooling demand values and a preset corresponding relation, and control the servo component to operate according to a corresponding execution opening so as to cool the cooling object; and the target demand value includes a maximum value among the cooling demand values.

In an embodiment, in the system, wherein the determination module is specifically configured to, according to the current temperature value and the temperature change rate of the cooling object, query a preset cooling demand table and determine the cooling demand value of the cooling object;

wherein the cooling demand table is configured to describe a corresponding relation between a temperature value as well as the temperature change rate and the cooling demand value.

In an embodiment, in the system, the control module includes:

a first determination unit configured to determine the maximum value among the cooling demand values as a target demand value;

a second determination unit configured to, according to the target demand value, query a control strategy table which is preset and determine the execution openings of the servo components and the control strategy table is configured to describe the corresponding relation between the execution opening of each of the servo components and the demand value; and a control unit configured to, according to the execution opening of the servo component, control the servo component to operate.

In an embodiment, in the system, a plurality of demand value intervals are set in the control strategy table, and the control module further includes:

a third determination unit configured to, according to the target demand value, determine a first demand value interval where the last demand value is located before querying a preset control strategy table and determining the execution openings of the servo components;

a fourth determination unit configured to determine an upper limit value and a lower limit value of the first demand value interval according to the control strategy table; and a performing unit configured to, when difference between the lower limit value and the target demand value reaches an interval switching threshold, or difference between the target demand value and the upper limit value reaches the interval switching threshold, perform the step of according to the target demand value, querying the preset control strategy table and determining the execution openings of the servo components.

Yet another objective of the embodiments of the present disclosure is to provide a vehicle, including the system for controlling cooling of the vehicle mentioned above.

Compared with related art, the method and system for controlling cooling of the vehicle and the vehicle disclosed in the present disclosure have advantages as follows:

When the vehicle is operating, a current temperature value and a temperature change rate of a cooling object in the vehicle is acquired, and a cooling demand value of the cooling object for describing the cooling demand intensity of the corresponding cooling object is determined according to the current temperature value and the temperature change rate of the cooling object, and then an execution opening of a servo component in a cooling system of the vehicle is determined according to a target demand value among the cooling demand values and a preset corresponding relation, and the servo component is controlled to operate according to the corresponding execution opening so as to cool the cooling object. Because the cooling demand value of the cooling object is determined according to its current temperature and temperature change rate, a temperature trend may be predicted in advance; meanwhile, the execution opening of the servo component in the vehicle cooling system is determined according to the maximum value among the cooling demand values of cooling objects and the preset corresponding relation, and the servo components are controlled to operate according to the corresponding execution opening Because the preset corresponding relation involves a balance relationship among the servo components in advance, the operating states of the servo components may be correlated and may be comprehensively controlled, so as to prevent the control system from oscillating and improve control stability, thus solving the problem that periodic oscillation of the operating states of the servo components is easily caused and service life of the servo components is affected in the existing control modes of a cooling system of a vehicle.

The above description is only a summary of technical schemes of the present disclosure, which may be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

The drawings which form a part of the present disclosure, are used to provide a further understanding of the present disclosure. Illustrative embodiments of the present disclosure and their descriptions are intended to explain the present disclosure, and not constructed as undue limitations on the present disclosure. In the drawings.

DETAILED DESCRIPTION OF THE EMBODIMENTS

Figure 1:
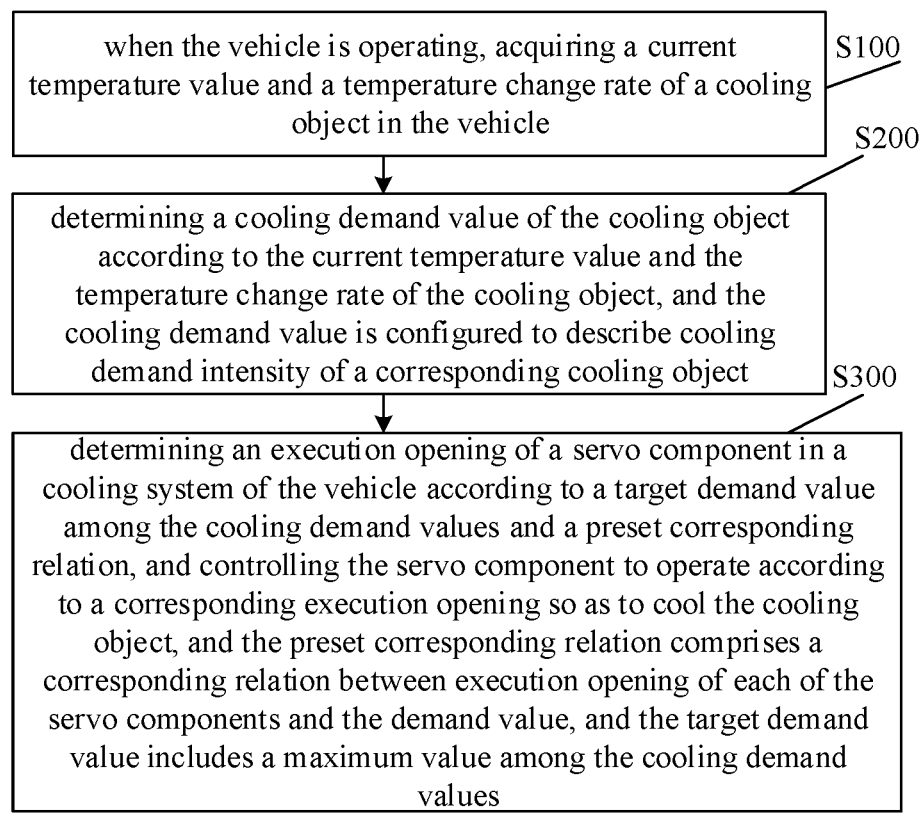
FIG. 1 is a flow chart of a method for controlling cooling of a vehicle according to an embodiment of the present disclosure.

Embodiments of the present disclosure will be described in more detail below with reference to the drawings. Although the embodiments of the present disclosure are shown in the drawings, it should be understood that the present disclosure may be implemented in various forms and should not be limited to the embodiments set forth herein. On the contrary, these embodiments are provided to enable a more thorough understanding of the present disclosure and to fully convey the scope of the present disclosure to those skilled in the art.

It should be noted that the embodiments in the present disclosure and the characteristics in the embodiments may be combined mutually in the case of no conflict.

The present disclosure will be described in details with reference to drawings and in combination with embodiments.

Referring to FIG. 1, which shows a flow chart of a method for controlling cooling of a vehicle according to an embodiment of the present disclosure. The method for controlling cooling of the vehicle according to the embodiment of the present disclosure includes steps S100 to S300.

The method for controlling cooling of the vehicle according to the embodiment of the present disclosure is applied to a whole-vehicle controller of the vehicle, which is in communication connection with cooling objects and the cooling system in the vehicle, and may obtain temperatures states of the cooling objects, and may also send a control instruction to the cooling system to correspondingly control operations of servo components in the cooling system.

In step S100, when the vehicle is operating, a current temperature value and a temperature change rate of a cooling object in the vehicle is acquired.

In the above step S100, the cooling object refers to parts or systems of the vehicle that need to be controlled in temperature by the cooling system and maintained in an appropriate temperature range. In practical applications, the cooling objects described above may be motors, motor controllers, voltage converters, etc.

In the step S100 described above, a current temperature value of a cooling temperature may be detected by a temperature sensor. Depending on different cooling objects, the current value corresponding to the cooling object may be directly detected by the temperature sensor, or may be indirectly obtained by detecting a temperature value of a coolant corresponding to the cooling object.

In practical applications, the current temperature value described above includes, but is not limited to, an inlet coolant temperature of the motor controller, an inlet coolant temperature of the voltage converter (DCDC), an inlet coolant temperature of the motor, a stator temperature of the motor and a body temperature of the motor controller.

In the above step S100, the temperature change rate is equal to $\Delta T/(\Delta t)$, wherein $\Delta T$ is temperature change in $\Delta t$ and $\Delta t$ is a time interval for calculating the temperature change rate. Specifically, the current temperature value of the cooling object may be continuously acquired at a preset time interval, and then the temperature change rate of the cooling object may be calculated from the current temperature value and the previously acquired temperature value of the cooling object. The temperature change rate before the first calculation is 0, and after the temperature change rate is calculated, a previous value is kept before a next calculation. The temperature change rate may be configured to predict the temperature trend in advance, and when it is predicted that the temperature of the cooling object may soon exceed the preset suitable temperature range, the cooling system may be involved in advance so as to avoid an overtemperature risk, and when it is predicted that the temperature of the cooling object may soon return from a state beyond the suitable temperature range to the suitable temperature range, the cooling system may be controlled to be withdrawn from the cooling operation in advance so as to reduce servo energy consumption.

In practical applications, the $\Delta t$ described above may be set to be 2 s, that is, the temperature change rate is calculated every 2 s.

In the step S200, a cooling demand value of the cooling object is determined according to the current temperature value and the temperature change rate of the cooling object. The cooling demand value is configured to describe cooling demand intensity of a corresponding cooling object.

In the above step S200, the cooling demand intensity refers to intensity of cooling required for the cooling object, and the cooling demand value is a numerical value used to describe the cooling demand intensity. Because the cooling demand intensity is affected by the temperature and temperature change rate of the cooling object, the higher the temperature of the cooling object, the more intensive the cooling demand of the cooling object and the higher a corresponding cooling demand value. The greater the temperature change rate of the cooling object, the faster the temperature of the cooling object changes, the more intensive the cooling demand of the cooling object and the higher a corresponding cooling demand value of the cooling object.

In the step S300, an execution opening of a servo component in a cooling system of the vehicle is determined according to a target demand value among the cooling demand values and a preset corresponding relation, and the servo component is controlled to operate according to a corresponding execution opening so as to cool the cooling object. The preset corresponding relation includes a corresponding relation between execution opening of each of the servo components and the demand value. The target demand value includes a maximum value among the cooling demand values.

In the above step S300, the servo component refers to a component that constitutes the cooling system and is configured to specifically realize cooling of the cooling object. In practical applications, the above servo component may be a fan, a water pump, a grille shutter, etc. The fan is specifically a Pulse Width Modulation (PWM) fan, the water pump is a Pulse Width Modulation (PWM) water pump, and the air intake format is specifically an Active Grille Shutter (AGS).

In the above step S300, the preset corresponding relation includes a corresponding relation between the execution opening of each of the servo components and the demand value. When the servo components operate according to the execution openings set according to the above corresponding relation, the servo components may operate in coordination without mutual restriction and conflict.

In the above step S300, at each time when the cooling demand values corresponding to the cooling objects are obtained, the cooling demand values corresponding to the cooling objects are compared, and the maximum value among cooling demand values is taken as the target demand value, then the execution opening of the servo component is determined according to the target demand value and the preset corresponding relation, and then the servo components are controlled to operate in coordination, so that not only cooling of the cooling object may be realized according to cooling intensity corresponding to the maximum value, but also mutual influence between the operating states of the servo components may be correlated and considered, which may make the servo components coordinate and stably perform the cooling operation, prevent frequent adjustment of operation intensity of the servo components caused by the mutual influence, and thus reduce oscillation of the control system.

In the above step S300, because the current maximum cooling demand intensity of the cooling objects is configured to correspondingly coordinate and control the operations of the servo components, and thus cooling demands of the cooling objects may always be met.

Compared with related art, the method for controlling cooling of the vehicle according to the present disclosure has following advantages.

When the vehicle is operating, the current temperature value and the temperature change rate of the cooling object in the vehicle is acquired, and the cooling demand value of the cooling object for describing the cooling demand intensity of the corresponding cooling object is determined according to the current temperature value and the temperature change rate of the cooling object, and then the execution opening of a servo component in a cooling system of the vehicle is determined according to a target demand value among the cooling demand values and a preset corresponding relation, and the servo component is controlled to operate according to the corresponding execution opening so as to cool the cooling object. Because the cooling demand value of the cooling object is determined according to its current temperature and temperature change rate, a temperature trend may be predicted in advance; meanwhile, the maximum value among the cooling demand values of the cooling objects is used to control operations of the servo components in the cooling system, so that the operating states of the servo components may be correlated and may be comprehensively controlled, so as to prevent the control system from oscillating and improve control stability, thus solving the problem that periodic oscillation of the operating states of the servo components is easily caused and service life of the servo components is affected in the existing control modes of the cooling system of the vehicle.

Optionally, in an embodiment, in the method for controlling cooling of the vehicle according to the embodiment of the present disclosure, the above step S200 includes step S201.

In the step S201, according to the current temperature value and the temperature change rate of the cooling object, querying a preset cooling demand table and determining the cooling demand value of the cooling object; wherein the cooling demand table being configured to describe a corresponding relation between a temperature value as well as the temperature change rate and the cooling demand value.

In the above step S201, the cooling demand table is a table showing the corresponding relation between the temperature value as well as the temperature change rate and the cooling demand value. When the temperature of the cooling object does not reach a state with overtemperature risk but is close to the state with overtemperature risk, the cooling system may be involved in advance to avoid the overtemperature risk. When the temperature of the cooling object does not recover to the suitable temperature range but is close to the suitable temperature range, the cooling system may be involved in advance to avoid the overtemperature risk and be withdrawn in advance to reduce the servo energy consumption. The above cooling demand table specifically needs to be determined by combining with cooling performance of the vehicle cooling system in advance and by specifically experimenting.

In the above cooling demand table, 0 is set to indicate no cooling demand, and 1 is set to indicate the maximum cooling demand, and the cooling demand gradually increases from 0.1 to 0.9 with the increased temperature and temperature change rate of the parts of the vehicle. Specifically, considering limitation of test data, it is possible to set several corresponding points of temperature, temperature change rate and cooling demand value at intervals, then the temperature is taken as one coordinate axis and the temperature change rate is taken as another coordinate axis, and a cooling demand value is obtained by interpolation according to a detected current temperature value and a calculated temperature change rate.

In addition, considering limitation of the execution opening control of the cooling performance of the cooling system. The temperature deviation rate greater than 0.2 is set to be 0.2, and the temperature change rate less than −0.2 is set to be −0.2, and no interpolation is performed.

For example, the above cooling demand table is shown in Table 1 below.

TABLE 1

| Cooling demand value (Req) | | Temperature (° C.) | | | | |
|---|---|---|---|---|---|---|
| | | 50° C. | 53° C. | 56° C. | 59° C. | 62° C. |
| Temperature change rate (° C./s) | 0.2 | 0.3 | 0.5 | 0.7 | 0.9 | 0.9 |
| | 0.1 | 0.2 | 0.4 | 0.6 | 0.8 | 0.9 |
| | 0 | 0.1 | 0.3 | 0.5 | 0.8 | 0.9 |
| | −0.1 | 0.1 | 0.1 | 0.4 | 0.7 | 0.9 |
| | −0.2 | 0.1 | 0.1 | 0.4 | 0.7 | 0.9 |
| Remarks | ① Based on after the cooling demand values of all parts being determined, the cooling demand table takes a maximum value and outputs the maximum cooling demand. | | | | | |
| | ② The cooling demand value (Req) only represents current internal demand of the | | | | | |

TABLE 1-continued

| | Temperature (° C.) | | | | |
|---|---|---|---|---|---|
| Cooling demand value (Req) | 50° C. | 53° C. | 56° C. | 59° C. | 62° C. | system, with 0 indicating the no demand and 1 indicating the maximum demand.

In the present embodiment, by setting the cooling demand table in advance, and then obtaining the current temperature value of the cooling object and calculating the temperature change rate of the cooling object, the cooling demand value may be quickly determined.

Optionally, in a specific embodiment, the above step S300 includes steps S301 to S303.

In the step S301, the maximum value among the cooling demand values is determined as the target demand value.

In the above step S301, because cooling demand intensity of different cooling objects is different, only when the cooling system operates at the maximum cooling demand intensity, the cooling demands of all of the cooling objects be met at the same time. Therefore, the cooling demand values corresponding to the cooling objects are compared, and the maximum value among the cooling demand values is taken as the target value for controlling the operation of the cooling system, that is, the above target demand value is obtained.

In the S302, according to the target demand value, querying a control strategy table which is preset and determining the execution openings of the servo components, and the control strategy table is configured to describe the corresponding relation between the execution opening of each of the servo components and the demand value.

In the above step S302, the control strategy table is a table for describing the corresponding relation between the execution openings of the servo components and the target demand value. When the servo components operate according to the execution opening determined by the control strategy table, the cooling object may be cooled in a coordinated and stable manner according to the intensity corresponding to the target demand value, so as to realize correlated control of the operating states of the servo components, prevent the control system from oscillating, and improve the control stability.

Because of the target demand value determined in the above step S301, the execution openings of the servo components may be inquired. The above control strategy table specifically needs to be determined by combining with specific performance of the servo components of the cooling system in advance and by specifically experimenting.

In the embodiment of the present disclosure, it is equivalent to controlling a plurality of servo components in the cooling system of the vehicle through an intermediate demand variable, that is, the target demand value, thereby greatly reducing calibration workload.

In the step S303, according to the execution opening of the servo component, controlling a corresponding servo component to operate.

In the above step S303, a control instruction is sent to a corresponding servo component according to the execution openings of the servo components of the cooling system obtained in the above step S302, so that the servo components may operate in coordination according to its corresponding execution opening, and thus the whole cooling system may serve to cool the cooling objects according to the cooling intensity corresponding to the target demand value.

In the above embodiment, a control strategy table for describing the corresponding relation between the execution openings of the servo components and the target demand value is set in advance according to the specific performance of the servo components. When the target demand value is obtained, the execution opening of the servo component may be quickly determined, and then the servo component may be controlled to operate according to this corresponding execution opening.

Optionally, in an embodiment, a plurality of demand value intervals are set in the control strategy table, and the execution openings corresponding to the servo components are different in at least two of the demand value intervals. That is, the target demand value needs to be divided into multiple intervals, and execution openings of the servo components corresponding to different target demand values in a same demand value interval is the same. Specifically, according to different servo components, the execution opening may be a specific opening or a driving duty cycle. For example, for the fan and the water pump, the above execution opening corresponds to the driving duty cycle, while for the grille shutter, the above execution opening is a specific opening.

Optionally, in an embodiment, when the target demand value is less than or equal to a first cooling threshold, the execution openings corresponding to the servo components are 0. When the target demand value is greater than or equal to a second cooling threshold, the execution openings corresponding to the servo components are an opening upper limit value. The second cooling threshold is greater than the first cooling threshold.

In the present embodiment, when the target demand value reaches a lower control limit state of the cooling system, the servo components are controlled to shut down directly. When the target demand value reaches an upper control limit state of the cooling system, the servo components are controlled to execute according to a maximum execution opening. For example, the first cooling threshold mentioned above may be 0.2, and the second cooling threshold mentioned above may be 0.9.

In practical applications, demand value intervals of different servo components are different. For example, the above control strategy table is shown in Table 2.

TABLE 2

| | Servo component Demand Determination | | | | | |
|---|---|---|---|---|---|---|
| Control Strategy | Req ≤ 0.2 | 0.2 < Req ≤ 0.6 | 0.6 < Req ≤ 0.8 | 0.8 < Req < 0.9 | Req ≥ 0.9 | Lower Critical Value |
| Duty Cycle of PWM Fan | OFF | Linear Adjustment from 20% to 90% | | | | −0.05 |
| Duty Cycle of PWM Water Pump | OFF | Linear Adjustment from 20% to 90% | | | | |
| Opening of Active Grille Shutter AGS | 0% | 40% | 60% | 80% | 100% | |

In Table 2, the target demand values corresponding to the fan and the water pump are divided into two intervals, one is less than or equal to 0.2 and the other is greater than 0.2. When the target demand value is less than or equal to 0.2, the execution openings of the fan and the water pump are 0, that is, the fan and the water pump are controlled to be closed. When the target demand value is greater than 0.2, the execution openings of the fan and water pump are between 20% and 90%, and have a linear relationship with the target demand value, that is, are adjusted linearly with the target demand value between 20% and 90%. Specifically, the execution openings of the fan and water pump are obtained by the target demand value multiplied by 100.

In Table 2, the target demand values corresponding to the grille shutter are divided into five intervals, which are less than or equal to 0.2, between 0.2 and 0.6, between 0.6 and 0.8, between 0.8 and 0.9 and greater than 0.9 respectively. When the target demand value is less than or equal to 0.2, the execution opening of the grille shutter is 0%, that is, the grille shutter is controlled to be closed. When the target demand value is greater than 0.2 and less than or equal to 0.6, the execution opening of the grille shutter is 40%. When the target demand value is greater than 0.6 and less than or equal to 0.8, the execution opening of the grille shutter is 60%. When the target demand value is greater than 0.8 and less than 0.9, the execution opening of the grille shutter is 80%. When the target demand value is greater than or equal to 0.9, the execution opening of the grille shutter is 100%.

TABLE 3

| Servo component | Cooling demand value (Req) | Servo component | Operating State |
|---|---|---|---|
| Driving Motor | 0.7 | Duty Cycle of PWM Fan | 70% |
| | | Duty Cycle of PWM Water Pump | 70% |
| | | Opening of Active Grille Shutter AGS | 60% |

For example, assuming that a current cooling demand of the driving motor is largest, if it is detected by the whole-vehicle controller that an inlet water temperature of the driving motor is 56° C. and the current temperature is 0.2° C. higher than that before 2 s, it may be determined by the whole-vehicle controller that the cooling demand value (Req) of the driving motor is 0.7 according to the above Table 1. An operating state of each of the servo components in the current cooling system may be determined based on the cooling demand value determined by the driving motor and in combination with the above control strategy table 2. The duty cycle of the PWM fan is 0.7*100, that is 70%, the duty ratio of the PWM water pump is 0.7*100, that is 70%, and the opening of the Active Grille Shutter AGS is 60%, which specifically may be referred to Table 3 for details.

Optionally, in an embodiment, after the above step S301 and before the above step S302, the method further includes steps S3011 to S3014.

In the step S3011, a first demand value interval where the last demand value is located is determined.

In the above step S3011, it is queried which demand value interval the cooling system of the vehicle operates in last time according to control history.

In the step S3012, an upper limit value and a lower limit value of the first demand value interval are determined according to the control strategy table.

In the above step S3012, since each of the demand value intervals in the control strategy table has a corresponding upper limit value and lower limit value, according to the control strategy table and the first demand value interval determined at step S3011, the upper limit value and lower limit value corresponding to the first demand value interval may be obtained.

In the step S3013, when difference between the lower limit value and the target demand value reaches an interval switching threshold, or difference between the target demand value and the upper limit value reaches the interval switching threshold, the step of according to the target demand value, querying the preset control strategy table and determining the execution openings of the servo components is performed.

In the step S3014, when the difference between the lower limit value and the target demand value does not reach the interval switching threshold, and the difference between the target demand value and the upper limit value does not reach the interval switching threshold, the current execution openings of the servo components are maintained.

In the above steps S3013 and S3014, the above interval switching threshold is a threshold for determining whether it is necessary to switch the execution opening of a servo component according to the target demand value corresponding to the servo component, that is, when the target demand value exceeds an original demand value interval and reaches the above interval switching threshold, the servo component is controlled to operate according to the execution opening corresponding to the target demand value. Otherwise, the original execution opening is maintained for cooling. In this way, it may be avoided that when the target demand value corresponding to the servo component fluctuates in two demand value intervals due to slight temperature change, the servo component oscillates and is adjusted back and forth between execution openings corresponding to the two demand value intervals. For example, the interval switching threshold described above may be 0.05.

In addition, the down value in the above table 2 is the interval switching threshold described above.

In the above steps S3013 and S3014, when the difference between the lower limit value and the target demand value reaches the interval switching threshold, or when the difference between the target demand value and the upper limit value reaches the interval switching threshold, the above step S302 is performed, otherwise, the current execution opening state of the servo component is maintained.

In the present embodiment, by setting the interval switching threshold, it may be avoided that when the target demand value corresponding to the servo component fluctuates in two demand value intervals due to slight temperature change, the servo component oscillates and is adjusted back and forth between the execution openings corresponding to the two demand value intervals; and the servo component may be controlled to operate more coordinately and stably, so that the cooling of the cooling objects of the vehicle may be realized according to the corresponding cooling demand intensity.

Figure 2:
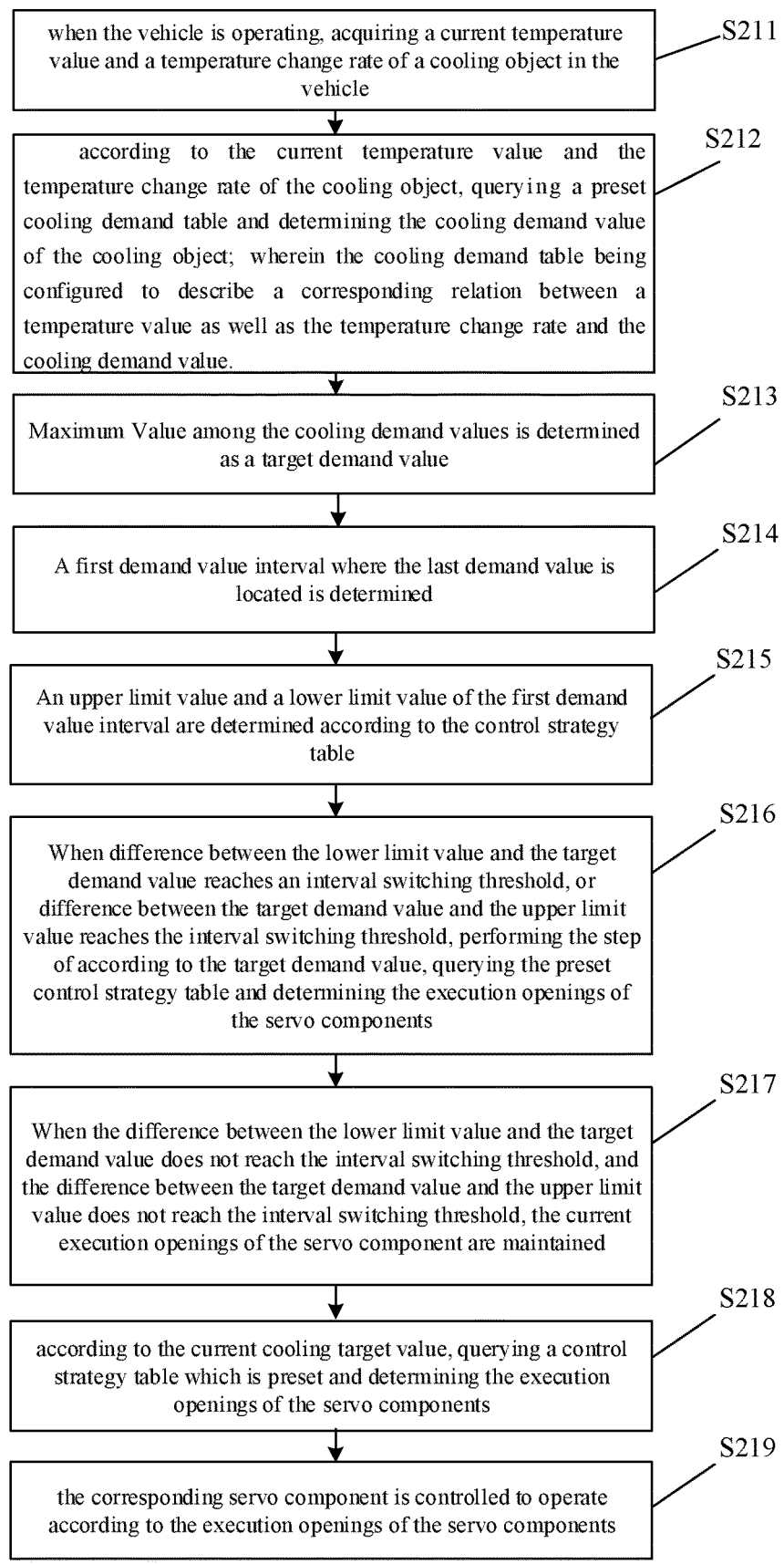
FIG. 2 is a flow chart of a method for controlling cooling of a vehicle according to a preferred embodiment of the present disclosure.

Referring to FIG. 2, a flow chart of a method for controlling cooling of the vehicle according to a preferred embodiment of the present disclosure is shown. A control strategy table is preset in the vehicle, the control strategy table is configured to describe the corresponding relation between the execution opening of the servo component and the demand value, and a plurality of demand value intervals are set in the control strategy table, and the execution openings corresponding to the servo components are different in at least two of the demand value intervals. The method includes steps S211 to S219.

In the step S211, when the vehicle is operating, a current temperature value and a temperature change rate of a cooling object in the vehicle is acquired.

The above step S211 may be referred to detailed description of step S100, which is not repeatedly described herein.

In the step S212, according to the current temperature value and the temperature change rate of the cooling object, querying a preset cooling demand table and determining the cooling demand value of the cooling object; wherein the cooling demand table being configured to describe a corresponding relation between a temperature value as well as the temperature change rate and the cooling demand value.

The above step S212 may be referred to detailed description of step S201, which is not repeatedly described herein.

In the step S213, a maximum value among the cooling demand values is determined as a target demand value.

The above step S213 may be referred to detailed description of step S301, which is not repeatedly described herein.

In the step S214, a first demand value interval where the last demand value is located is determined.

The above step S214 may be referred to detailed description of step S3011, which is not repeatedly described herein.

In the step S215, an upper limit value and a lower limit value of the first demand value interval are determined according to the control strategy table.

The above step S215 may be referred to detailed description of step S3012, which is not repeatedly described herein.

In the step S216, when difference between the lower limit value and the target demand value reaches an interval switching threshold, or difference between the target demand value and the upper limit value reaches the interval switching threshold, the step of according to the target demand value, querying the preset control strategy table and determining the execution openings of the servo components is performed.

The above step S216 may be referred to detailed description of step S3013, which is not repeatedly described herein.

In the step S217, when the difference between the lower limit value and the target demand value does not reach the interval switching threshold, and the difference between the target demand value and the upper limit value does not reach the interval switching threshold, the current execution openings of the servo components are maintained.

The above step S217 may be referred to detailed description of step S3014, which is not repeatedly described herein.

In the S218, according to the current cooling target value, querying a control strategy table which is preset and determining the execution openings of the servo components.

The above step S218 may be referred to detailed description of step S302, which is not repeatedly described herein.

In the step S219, the corresponding servo component is controlled to operate according to the execution openings of the servo components.

The above step S219 may be referred to detailed description of step S303, which is not repeatedly described herein.

Compared with related art, the method for controlling cooling of the vehicle according to the embodiment of the present disclosure has following advantages.

The cooling demand value of the cooling object is determined according to its current temperature and temperature change rate, the temperature trend may be predicted in advance, so that the cooling system may be involved in advance to avoid the overtemperature risk, or be withdrawn in advance to reduce the servo energy consumption; meanwhile, the maximum value among the cooling demand values of the cooling objects is used to control operations of the servo components in the cooling system, so that the operating states of the servo components may be correlated and may be comprehensively controlled, so as to prevent the control system from oscillating and improve control stability, thus solving the problem that periodic oscillation of the operating states of the servo components is easily caused and service life of the servo components is affected in the existing control modes of the cooling system of the vehicle. In addition, in the present embodiment, by setting the interval switching threshold, it may be avoided that when the target demand value corresponding to the servo component fluctuates in two demand value intervals due to slight temperature change, the servo component oscillates and is adjusted back and forth between execution openings corresponding to the two demand value intervals; and the servo component may be controlled to operate more coordinately and stably, so that the cooling of the cooling object of the vehicle may be realized according to the corresponding cooling demand intensity.

Figure 3:
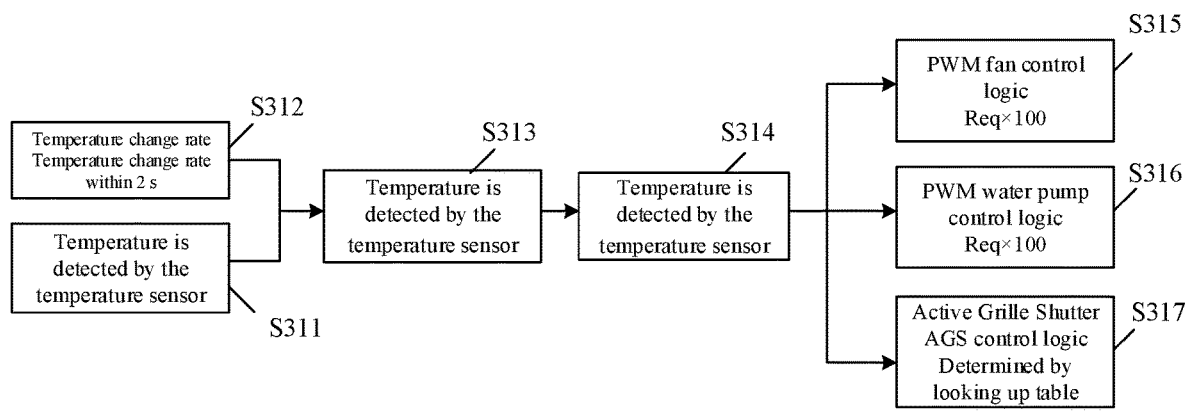
FIG. 3 is a technical schematic diagram of a method for controlling cooling of a vehicle according to an embodiment of the present disclosure.

In practical applications, referring to FIG. 3, a technical schematic diagram of a method for controlling cooling of a vehicle according to an embodiment of the present disclosure is shown.

As shown in FIG. 3, in the step S311, when the vehicle is operating, the temperature of the cooling component required to be cooled is detected by a temperature sensor.

In the step S312, the temperature change rate of the cooling component within 2 s is calculated.

In the step S313, according to the temperature and the temperature change rate of the cooling component, the cooling demand is determined by interpolation and the cooling demand value of the cooling component is obtained by being calculated.

In the step S314, a maximum value among cooling demand values of cooling components is taken as the target demand value for controlling operation of the cooling system.

In the step S315, according to a PWM fan control logic, the fan is controlled to operate according to the target demand value determined in step S314.

In the step S316, according to a PWM water pump control logic, the water pump is controlled to operate according to the target demand value determined in step S314.

In the step S317, according to an Active Grille Shutter AGS control logic, opening of the Active Grille Shutter AGS is controlled according to the target demand value determined in step S314.

Figure 4:
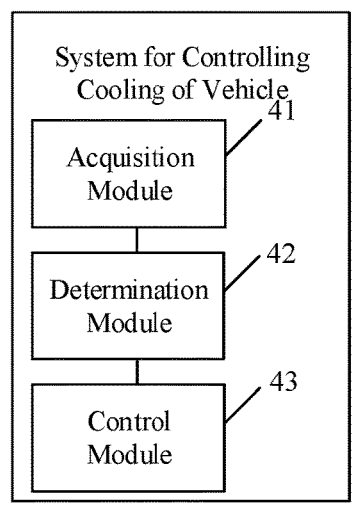
FIG. 4 is a structural schematic diagram of a system for controlling cooling of a vehicle according to an embodiment of the present disclosure.

Another object of the present disclosure is to provide a system for controlling cooling of the vehicle. Referring to FIG. 4, a schematic structural diagram of a system for controlling cooling of the vehicle according to an embodiment of the present disclosure is shown in FIG. 4. The system includes an acquisition module 41, a determination module 42 and a control module 43.

The acquisition module 41 is configured to, when the vehicle is operating, acquire a current temperature value and a temperature change rate of a cooling object in the vehicle.

The determination module 42 is configured to determine a cooling demand value of the cooling object according to the current temperature value and the temperature change rate of the cooling object. The cooling demand value is configured to describe cooling demand intensity of a corresponding cooling object.

The control module 43 is configured to determine an execution opening of a servo component in a cooling system of the vehicle according to a target demand value among the cooling demand values and a preset corresponding relation, and to control the servo component to operate according to a corresponding execution opening so as to cool the cooling object. The target demand value includes a maximum value among the cooling demand values.

In the system according to the embodiment of the present disclosure, when the vehicle is operating, the current temperature and the temperature change rate of the cooling object in the vehicle is acquired by the acquisition module 41 and the cooling demand value of the cooling object for describing the cooling demand intensity of the corresponding cooling object is determined by the determination module 42 according to the current temperature value and the temperature change rate of the cooling object, and then the execution opening of a servo component in a cooling system of the vehicle is determined by the control module 43 according to a target demand value among the cooling demand values and a preset corresponding relation, and the servo component is controlled to operate according to a corresponding execution opening so as to cool the cooling object. Because the cooling demand value of the cooling object is determined according to its current temperature and temperature change rate, the temperature trend may be predicted in advance, so that the cooling system may be involved in advance to avoid the overtemperature risk, or be withdrawn in advance to reduce the servo energy consumption; meanwhile, the maximum value among the cooling demand values of the cooling objects is used to control operations of the servo components in the cooling system, so that the operating states of the servo components may be correlated and may be comprehensively controlled, so as to prevent the control system from oscillating and improve control stability, thus solving the problem that periodic oscillation of the operating states of the servo components is easily caused and service life of the servo components is affected in the existing control modes of the cooling system of the vehicle.

Optionally, in the system, the determination module 42 is specifically configured to, according to the current temperature value and the temperature change rate of the cooling object, query a preset cooling demand table and determine the cooling demand value of the cooling object. The cooling demand table is configured to describe a corresponding relation between a temperature value as well as the temperature change rate and the cooling demand value.

Optionally, in the system, the control module 43 includes a first determination unit, a second determination unit and a control unit.

The first determination unit is configured to determine the maximum value among the cooling demand values as a target demand value.

The second determination unit is configured to, according to the target demand value, query a control strategy table which is preset and determine the execution openings of the servo components. The control strategy table is configured to describe the corresponding relation between the execution opening of each of the servo components and the demand value.

The control unit is configured to control the servo component to operate according to the execution opening of the servo component.

Optionally, in the system, a plurality of demand value intervals are set in the control strategy table, and the execution opening corresponding to the servo component is different in at least two of the demand value intervals. The control module 43 further includes a third determination unit, a fourth determination unit and a performing unit.

The third determination unit is configured to, according to the target demand value, determine a first demand value interval where the last demand value is located before querying a preset control strategy table and determining the execution openings of the servo components;

The fourth determination unit configured to determine an upper limit value and a lower limit value of the first demand value interval according to the control strategy table; and The performing unit configured to, when difference between the lower limit value and the target demand value reaches an interval switching threshold, or difference between the target demand value and the upper limit value reaches the interval switching threshold, perform the step of according to the target demand value, querying the preset control strategy table and determining the execution openings of the servo components.

Yet another object of the present disclosure is to provide a vehicle. The vehicle further includes the system for controlling cooling of the vehicle as described above.

Compared with the related art, the system for controlling cooling of the vehicle, the vehicle and the method for controlling cooling of the vehicle described above have same advantages, which will not be repeatedly described herein again.

To sum up, for the method and the system for controlling cooling of the vehicle and the vehicle, when the vehicle is operating, the current temperature value and the temperature change rate of the cooling object in the vehicle is acquired, and the cooling demand value of the cooling object for describing the cooling demand intensity of the corresponding cooling object is determined according to the current temperature value and the temperature change rate of the cooling object, and then the execution opening of a servo component in a cooling system of the vehicle is determined according to a target demand value among the cooling demand values and a preset corresponding relation, and the servo component is controlled to operate according to the corresponding execution opening so as to cool the cooling object. Because the cooling demand value of the cooling object is determined according to its current temperature and temperature change rate, the temperature trend may be predicted in advance, so that the cooling system may be involved in advance to avoid the overtemperature risk, or be withdrawn in advance to reduce the servo energy consumption; meanwhile, the maximum value among the cooling demand values of the cooling objects is used to control operations of the servo components in the cooling system, so that the operating states of the servo components may be correlated and may be comprehensively controlled, so as to prevent the control system from oscillating and improve control stability, thus solving the problem that periodic oscillation of the operating states of the servo components is easily caused and service life of the servo components is affected in the existing control modes of the cooling system of the vehicle.

It can be clearly understood by those skilled in the art that, for the convenience and conciseness of description, the specific operation processes of the system, apparatus and units described above can be referred to corresponding processes in the method embodiments described above, which will not be repeatedly described herein again.

The above-described apparatus embodiments are only schematic, in which units described as separate components may or may not be physically separated, and the components shown as the units may or may not be physical units, that is, they may be located in one place or distributed over multiple network units. Some or all of the modules may be selected according to actual needs to achieve purposes of this embodiment. The embodiments may be understood and implemented by the ordinary skilled in the art without paying creative labor.

Various component embodiments disclosed herein may be implemented in hardware, or in software modules executed on one or more processors, or in a combination thereof. It should be understood by those skilled in the art that some or all of functions of some or all of the components in the computing processing device according to the embodiments of the present disclosure may be realized in practice by using a microprocessor or a digital signal processor (DSP). The present disclosure may also be implemented as device or apparatus programs (e.g., computer programs and computer program products) for performing part or all of the methods described herein. Such programs for realizing the present disclosure may be stored on a computer readable medium, or may be in a form of one or more signals. Such signals may be downloaded from Internet websites, or provided on carrier signals, or provided in any other form.

Figure 5:
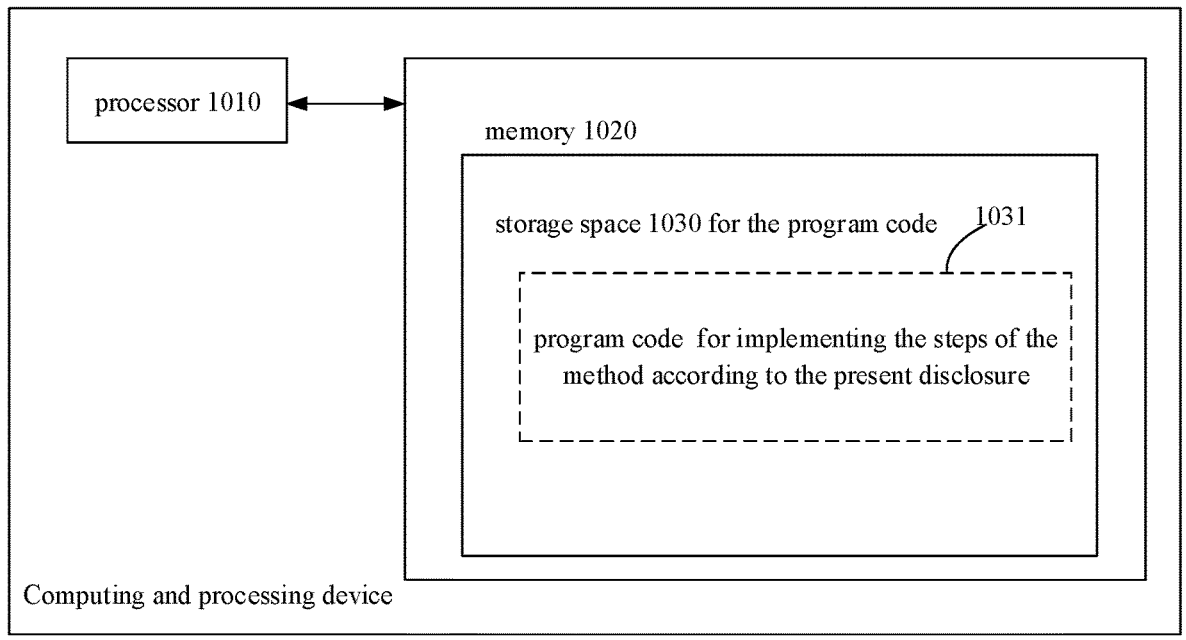
FIG. 5 schematically shows a block diagram of a computing processing device for executing the method according to the present disclosure.
Figure 6:
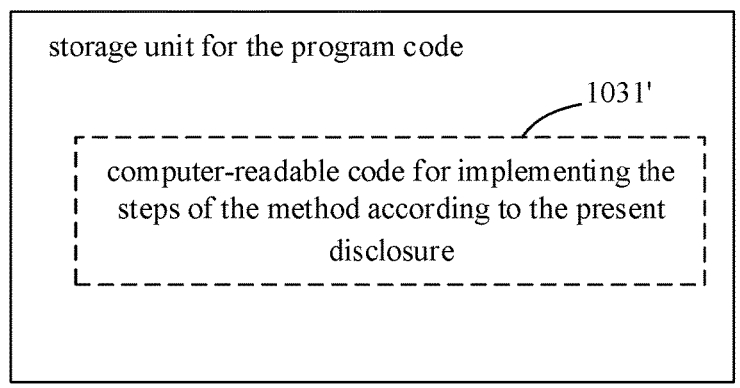
FIG. 6 schematically shows a storage unit for holding or carrying program codes for implementing the method according to the present disclosure.

For example, FIG. 5 shows a computing processing device that may implement the methods according to the present disclosure. The computing processing device conventionally includes a processor 1010 and a computer program product or a computer readable medium in a form of a memory 1020. The memory 1020 may be an electronic memory such as a flash memory, an EEPROM (electrically erasable programmable read only memory), an EPROM, a hard disk or a ROM. The memory 1020 has a storage space 1030 for program codes 1031 for executing any of steps in the above methods. For example, the storage space 1030 for program codes may include various program codes 1031 for implementing various steps in the above method, respectively. These program codes may be read from or written into one or more computer program products. These computer program products include program code carriers such as hard disks, compact disks (CD), memory cards or floppy disks. Such computer program products are usually portable or fixed storage units as described with reference to FIG. 6. The memory unit may have memory segments, memory spaces, and the like arranged similarly to the memory 1020 in the computing processing device of FIG. 5. The program may be compressed in an appropriate form, for example. Generally, the storage unit includes computer readable codes 1031', i.e., codes that may be read by, for example, a processor such as 1010, which, when executed by a computing processing device, causes the computing processing device to perform various steps in the methods described above.

The above description is only the preferred embodiments of the present disclosure, and it is not intended to limit the present disclosure. Any modification, equivalent substitution, improvement, etc. made within the spirit and principle of the present disclosure shall be encompassed within the protection scope of the present disclosure.

The above is only specific embodiments of the present disclosure, but a protection scope of the present disclosure is not limited to this, and any change or substitution which occurs to any person familiar with this technical field within the technical scope disclosed by the present disclosure should be encompassed within the protection scope of the present disclosure. Therefore, a protection scope of the present disclosure shall be subject to a protection scope of the claims.

The invention claimed is:

1. A method for controlling cooling of a vehicle, comprising:
   by one or more processors, when the vehicle is operating, acquiring a current temperature value and a temperature change rate of a cooling object in the vehicle;
   by one or more processors, determining a cooling demand value of the cooling object according to the current temperature value and the temperature change rate of the cooling object, and the cooling demand value is configured to describe cooling demand intensity of a corresponding cooling object; and
   by one or more processors, determining an execution opening of a servo component in a cooling system of the vehicle according to a target demand value among the cooling demand values and a preset corresponding relation, and controlling the servo component to operate according to a corresponding execution opening so as to cool the cooling object, and the preset corresponding relation comprises a corresponding relation between execution opening of each of the servo components and the demand value, and the target demand value comprises a maximum value among the cooling demand values;
   the step of determining the cooling demand value of the cooling object according to the current temperature value and the temperature change rate of the cooling object comprises:
   according to the current temperature value and the temperature change rate of the cooling object, querying a preset cooling demand table and determining the cooling demand value of the cooling object;
   wherein the cooling demand table being configured to describe a corresponding relation between a temperature value as well as the temperature change rate and the cooling demand value;
   the step of determining the execution opening of the servo component in the cooling system of the vehicle according to the target demand value among the cooling demand values and the preset corresponding relation and controlling the servo component to operate according to the corresponding execution opening so as to cool the cooling object comprises:
determining the maximum value among the cooling demand values as the target demand value;
according to the target demand value, querying a control strategy table which is preset and determining the execution openings of the servo components, and the control strategy table is configured to describe the corresponding relation between the execution opening of each of the servo components and the demand value; and
according to the execution opening of the servo component, controlling a corresponding servo component to operate;
in the control strategy table, when the target demand value is less than or equal to a first cooling threshold, the execution openings corresponding to the servo components are 0;
when the target demand value is greater than or equal to a second cooling threshold, the execution openings corresponding to the servo components are an opening upper limit value; and
the second cooling threshold being greater than the first cooling threshold.

2. The method according to claim 1, wherein a plurality of demand value intervals are set in the control strategy table, and the execution openings corresponding to the servo components are different in at least two demand value intervals.

3. The method according to claim 2, wherein before the step of according to the target demand value, querying the preset control strategy table and determining the execution openings of the servo components, the method comprises:
determining a first demand value interval where the last demand value is located;
determining an upper limit value and a lower limit value of the first demand value interval according to the control strategy table;
when difference between the lower limit value and the target demand value reaches an interval switching threshold, or difference between the target demand value and the upper limit value reaches the interval switching threshold, performing the step of according to the target demand value, querying the preset control strategy table and determining the execution openings of the servo components; and
when the difference between the lower limit value and the target demand value does not reach the interval switching threshold, and the difference between the target demand value and the upper limit value does not reach the interval switching threshold, maintaining the current execution openings of the servo components.

4. The method according to claim 1, wherein the servo component comprises a fan, a water pump and a grille shutter.

5. A system for controlling cooling of a vehicle, the system comprising:
one or more processors and a storage apparatus; and
the storage apparatus stores a computer program which, when executed by the processor, perform the operations comprising:
an acquisition module configured to, when the vehicle is operating, acquiring a current temperature value and a temperature change rate of a cooling object in the vehicle;
determining a cooling demand value of the cooling object according to the current temperature value and the temperature change rate of the cooling object, and the cooling demand value is configured to describe cooling demand intensity of a corresponding cooling object; and
determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values;
the operation of determining a cooling demand value of the cooling object according to the current temperature value and the temperature change rate of the cooling object, and the cooling demand value is configured to describe cooling demand intensity of a corresponding cooling object is to, according to the current temperature value and the temperature change rate of the cooling object, query a preset cooling demand table and determine the cooling demand value of the cooling object;
wherein the cooling demand table is configured to describe a corresponding relation between a temperature value as well as the temperature change rate and the cooling demand value;
the operation of determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values comprises:
determining the maximum value among the cooling demand values as a target demand value;
according to the target demand value, querying a control strategy table which is preset and determining the execution openings of the servo components and the control strategy table is configured to describe the corresponding relation between the execution opening of each of the servo components and the demand value; and
according to the execution opening of the servo component, controlling the servo component to operate;
a plurality of demand value intervals are set in the control strategy table, and the operation of determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values further comprises:
according to the target demand value, determining a first demand value interval where the last demand value is located before querying a preset control strategy table and determining the execution openings of the servo components;
determining an upper limit value and a lower limit value of the first demand value interval according to the control strategy table; and when difference between the lower limit value and the target demand value reaches an interval switching threshold, or difference between the target demand value and the upper limit value reaches the interval switching threshold, performing the step of according to the target demand value, querying the preset control strategy table and determining the execution openings of the servo components.

6. A vehicle, comprising a system for controlling cooling of a vehicle, wherein the system comprises:

one or more processors and a storage apparatus; and the storage apparatus stores a computer program which, when executed by the processor, perform the operations comprising:

an acquisition module configured to, when the vehicle is operating, acquiring a current temperature value and a temperature change rate of a cooling object in the vehicle;

determining a cooling demand value of the cooling object according to the current temperature value and the temperature change rate of the cooling object, and the cooling demand value is configured to describe cooling demand intensity of a corresponding cooling object; and determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values;

the operation of determining a cooling demand value of the cooling object according to the current temperature value and the temperature change rate of the cooling object, and the cooling demand value is configured to describe cooling demand intensity of a corresponding cooling object is to, according to the current temperature value and the temperature change rate of the cooling object, query a preset cooling demand table and determine the cooling demand value of the cooling object;

wherein the cooling demand table is configured to describe a corresponding relation between a temperature value as well as the temperature change rate and the cooling demand value;

the operation of determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values comprises:

determining the maximum value among the cooling demand values as a target demand value;

according to the target demand value, querying a control strategy table which is preset and determining the execution openings of the servo components and the control strategy table is configured to describe the corresponding relation between the execution opening of each of the servo components and the demand value; and according to the execution opening of the servo component, controlling the servo component to operate;

a plurality of demand value intervals are set in the control strategy table, and the operation of determining an execution opening of a servo component in a cooling system of the vehicle according to a target demand value among the cooling demand values and a preset corresponding relation, and control the servo component to operate according to a corresponding execution opening so as to cool the cooling object; and the target demand value comprises a maximum value among the cooling demand values further comprises:

according to the target demand value, determining a first demand value interval where the last demand value is located before querying a preset control strategy table and determining the execution openings of the servo components;

determining an upper limit value and a lower limit value of the first demand value interval according to the control strategy table; and when difference between the lower limit value and the target demand value reaches an interval switching threshold, or difference between the target demand value and the upper limit value reaches the interval switching threshold, performing the step of according to the target demand value, querying the preset control strategy table and determining the execution openings of the servo components.

* * * * *